US009580133B2

(12) United States Patent
Aymar

(10) Patent No.: US 9,580,133 B2
(45) Date of Patent: Feb. 28, 2017

(54) SHOCK ABSORBING GRIP ASSEMBLY

(71) Applicant: Brandon P. Aymar, Santee, CA (US)

(72) Inventor: Brandon P. Aymar, Santee, CA (US)

(*) Notice: Subject to any disclaimer, the term of this patent is extended or adjusted under 35 U.S.C. 154(b) by 0 days.

(21) Appl. No.: 14/878,866

(22) Filed: Oct. 8, 2015

(65) Prior Publication Data
US 2016/0101824 A1    Apr. 14, 2016

Related U.S. Application Data

(60) Provisional application No. 62/061,365, filed on Oct. 8, 2014.

(51) Int. Cl.
*B62K 21/26* (2006.01)
*B25G 1/01* (2006.01)
*B25G 1/10* (2006.01)
*A63B 53/14* (2015.01)

(52) U.S. Cl.
CPC .............. *B62K 21/26* (2013.01); *A63B 53/14* (2013.01); *A63B 59/50* (2015.10); *A63B 60/08* (2015.10); *A63B 60/14* (2015.10); *A63B 60/52* (2015.10); *A63B 60/54* (2015.10); *B25G 1/01* (2013.01); *B25G 1/102* (2013.01); *A63B 2102/18* (2015.10); *Y10T 16/498* (2015.01)

(58) Field of Classification Search
CPC ...... Y10T 16/466; Y10T 16/48; Y10T 16/498; Y10T 16/476; Y10T 74/20834; Y10T 29/49615; B62K 21/26; B25G 1/102; B25G 1/01; A63B 60/08; A63B 53/14; A63B 60/52; A63B 60/54; A63B 60/14; A63B 59/50; A63B 2102/18

USPC    16/421, 431, 436, 430; 74/551.9; 29/896.93
See application file for complete search history.

(56) References Cited

U.S. PATENT DOCUMENTS

| | | | | |
|---|---|---|---|---|
| 3,189,069 A * | 6/1965 | Stowell | ..................... | B25G 1/00 16/421 |
| 7,013,533 B2 * | 3/2006 | Lumpkin | ............... | B62K 21/26 16/421 |
| 7,347,121 B2 * | 3/2008 | Wu | ......................... | B62K 21/26 74/551.9 |
| 7,712,394 B2 * | 5/2010 | Wu | ......................... | B62K 21/26 16/421 |
| 8,234,952 B2 * | 8/2012 | Ting | ......................... | B62K 21/26 74/551.8 |
| 8,250,714 B2 * | 8/2012 | Ming-Chang | ............ | B25G 3/20 16/421 |

(Continued)

*Primary Examiner* — William Miller
(74) *Attorney, Agent, or Firm* — Richard D. Clarke

(57) ABSTRACT

The present invention is directed to a Shock Absorbing Grip Assembly that has been designed to give a controlled floating action to the grip that can be adjusted by varying the different cushioning isolator mechanisms within the grip, or by varying the number of tuning washers. The Shock Absorbing Grip Assembly is comprised of one or more grip end clamps; one or more cavities in said grip end clamps; a grip sleeve having one or more protruding engagement members; one or more elastomeric isolator inserts housed within each of said one or more cavities in said grip end clamps, wherein said one or more protruding engagement members mates within said cavities housing said elastomeric isolator inserts; and an outer elastomer grip; whereby said grip sleeve is free floating and has torsional, rotational, linear and axial shock absorbing capacity. The isolator inserts may be elastomer inserts of varying durometer material.

24 Claims, 16 Drawing Sheets

(56) References Cited

U.S. PATENT DOCUMENTS

| | | | | |
|---|---|---|---|---|
| 8,484,806 B2* | 7/2013 | Rarick | ............... | B62K 21/26 16/421 |
| 2008/0156139 A1* | 7/2008 | Lai | ............... | B62K 21/26 74/551.9 |
| 2010/0126301 A1* | 5/2010 | Yu | ............... | B62K 21/26 74/551.9 |

* cited by examiner

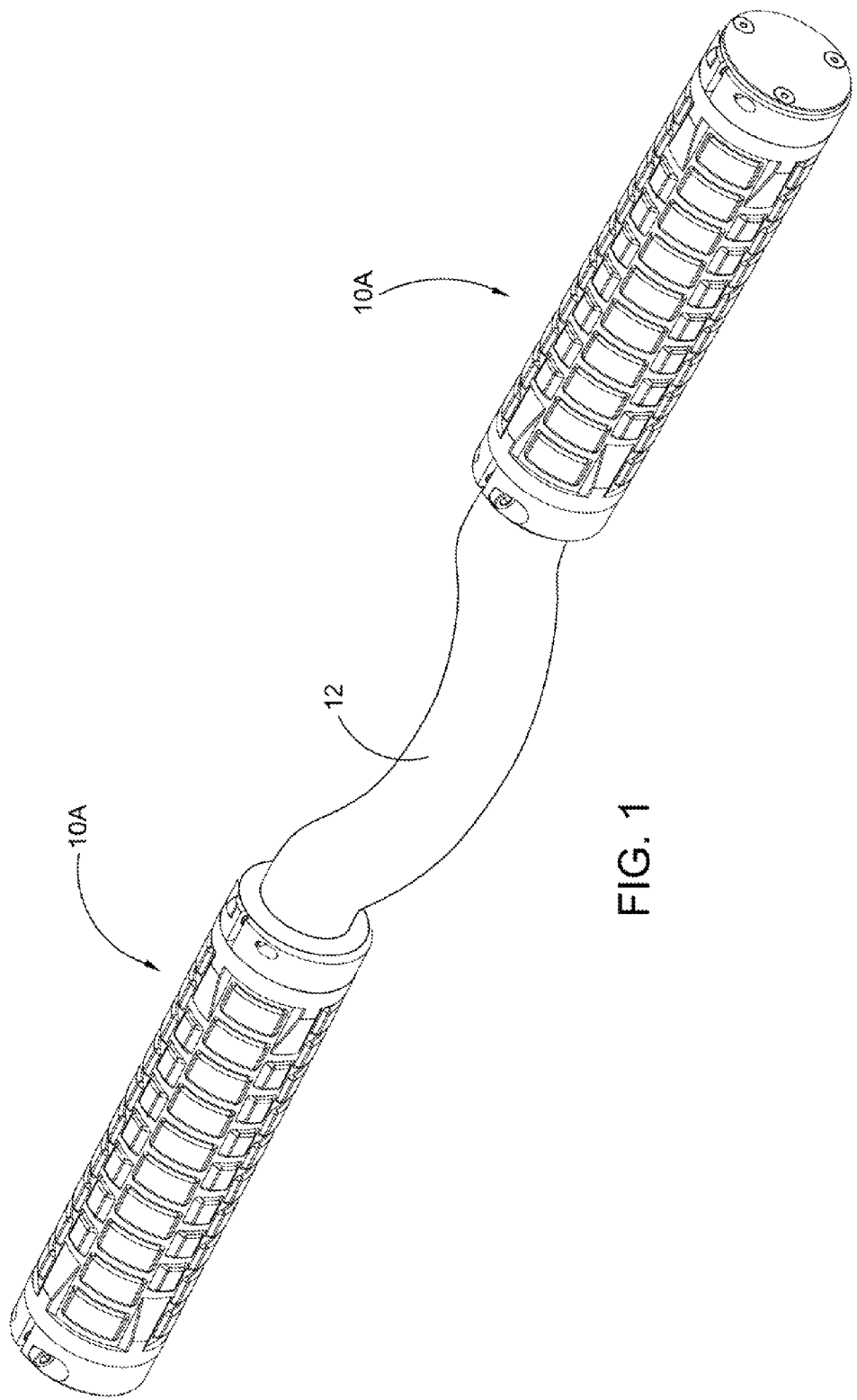

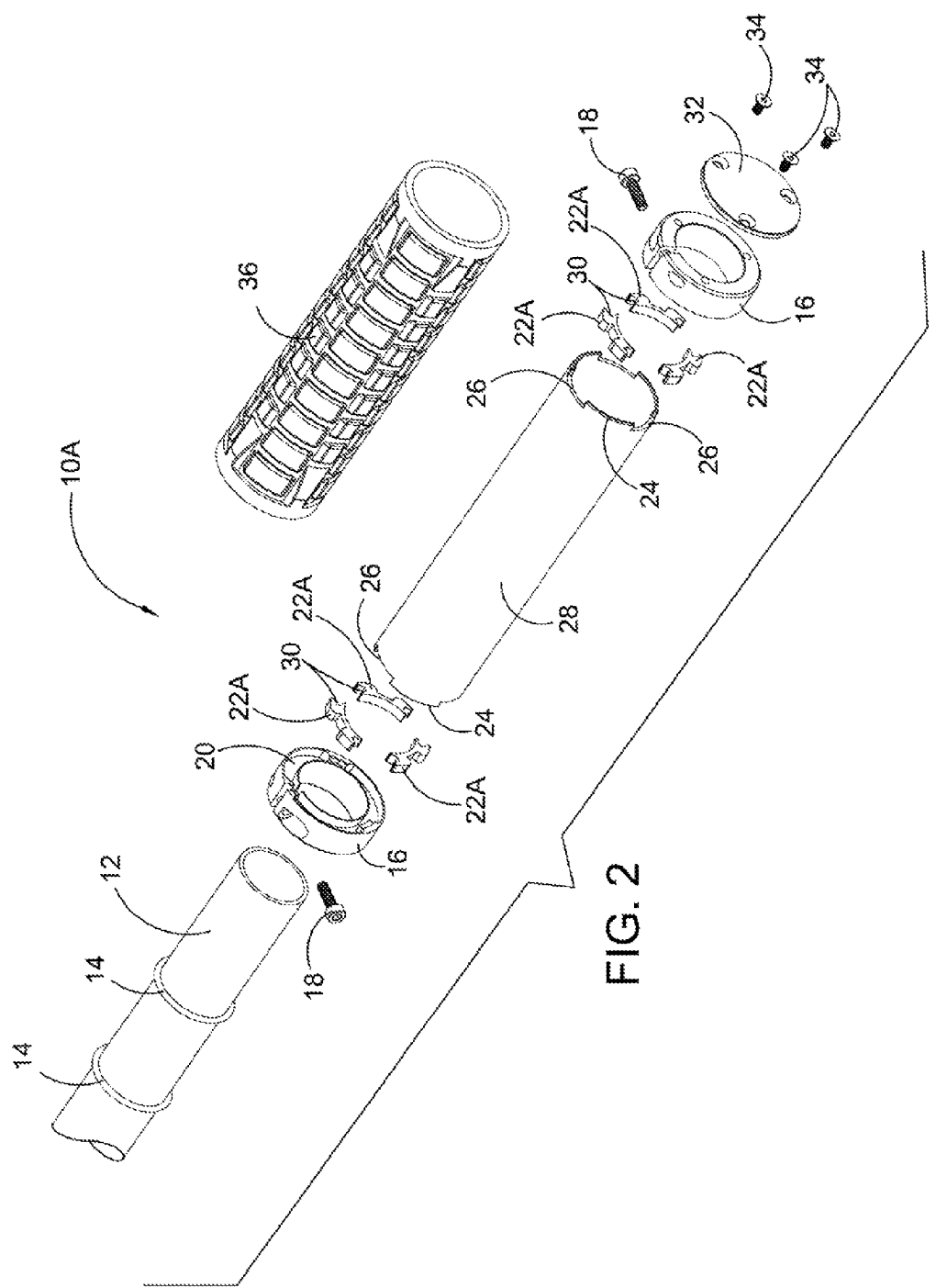

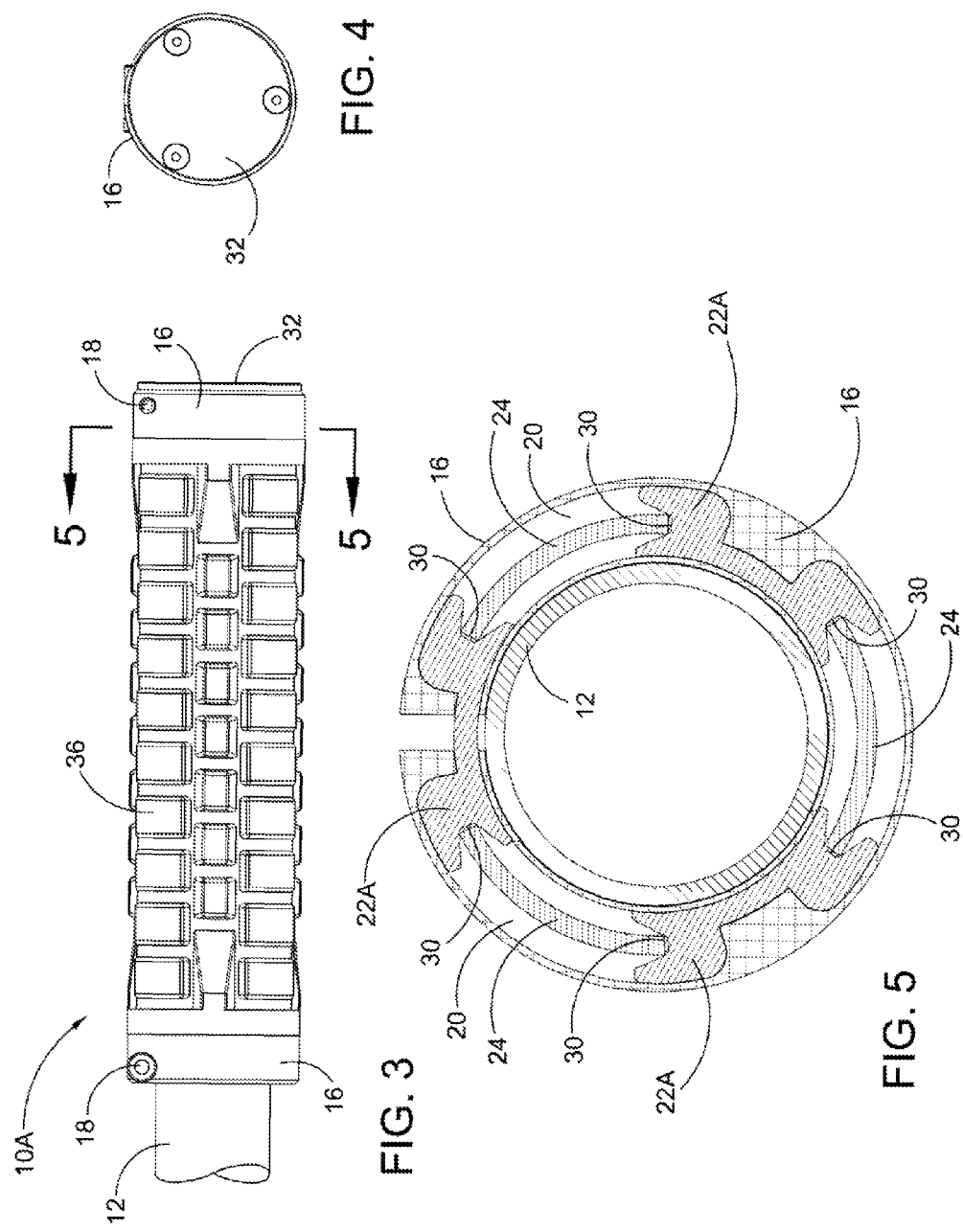

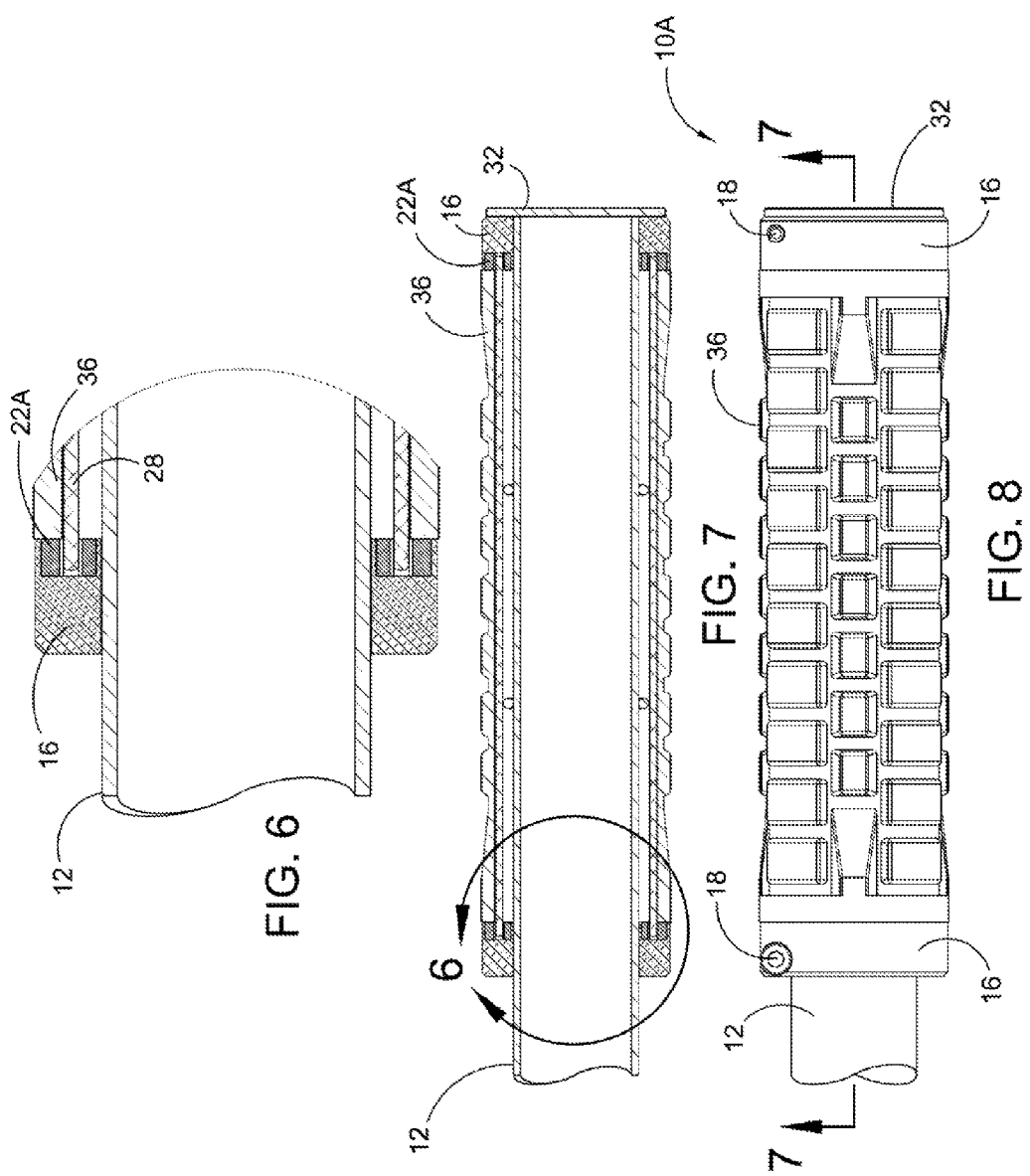

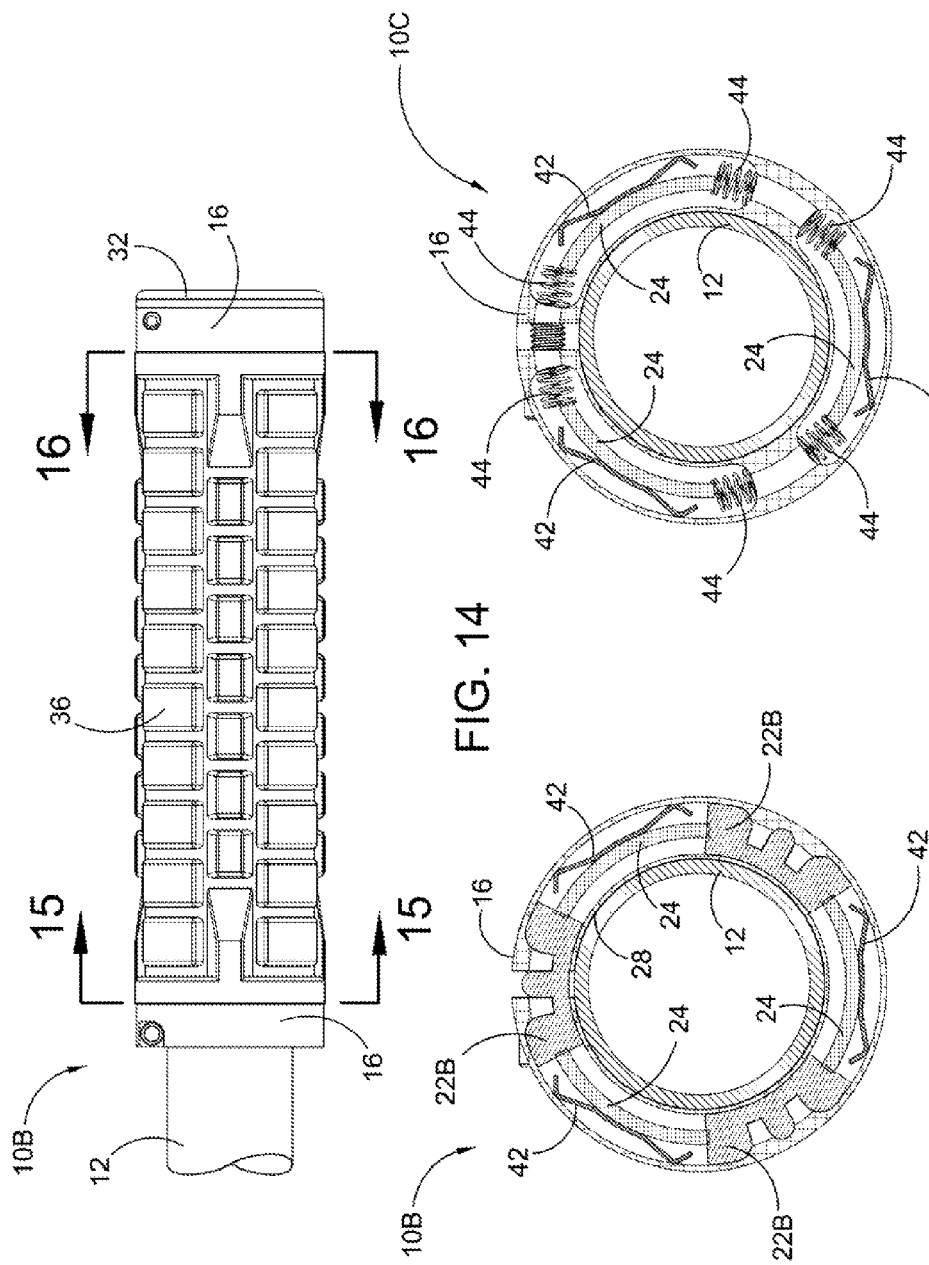

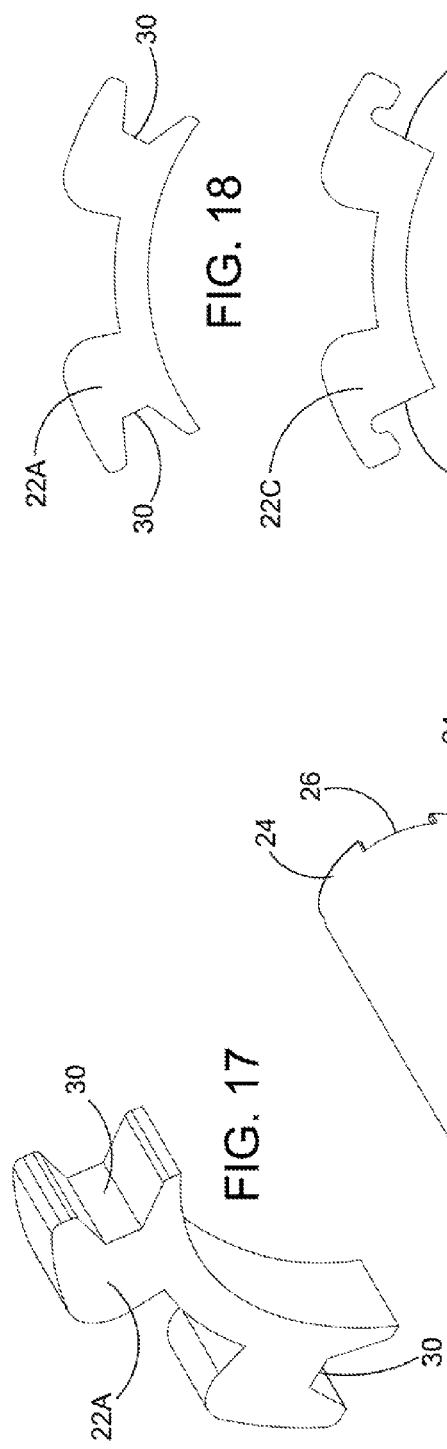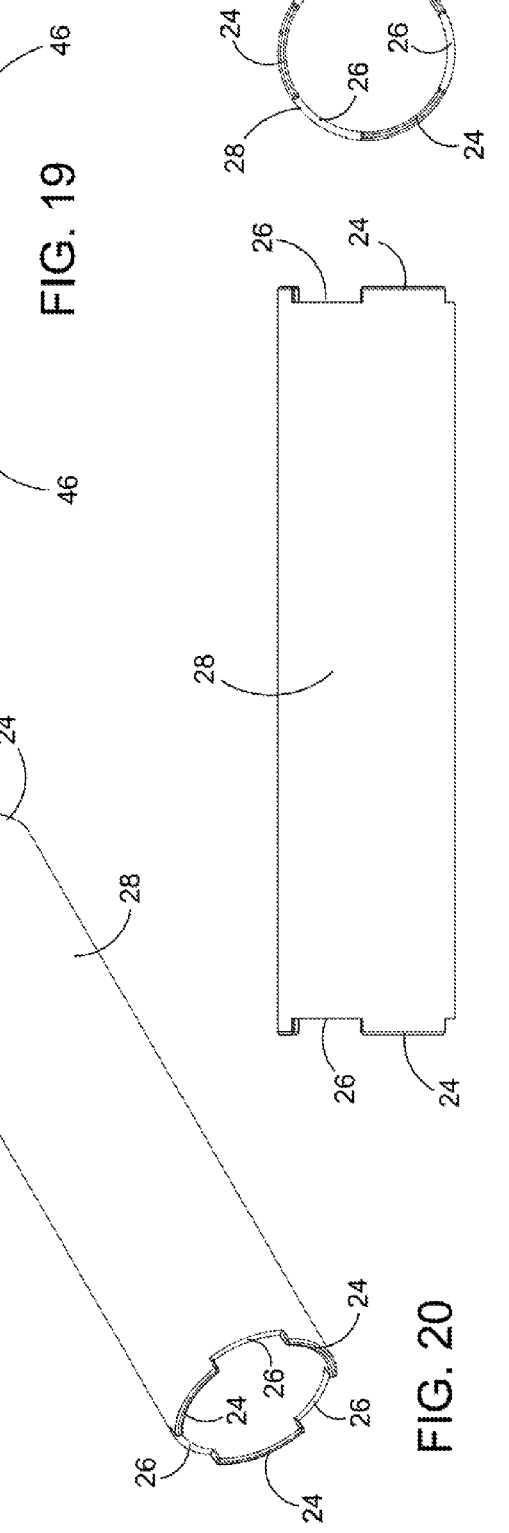

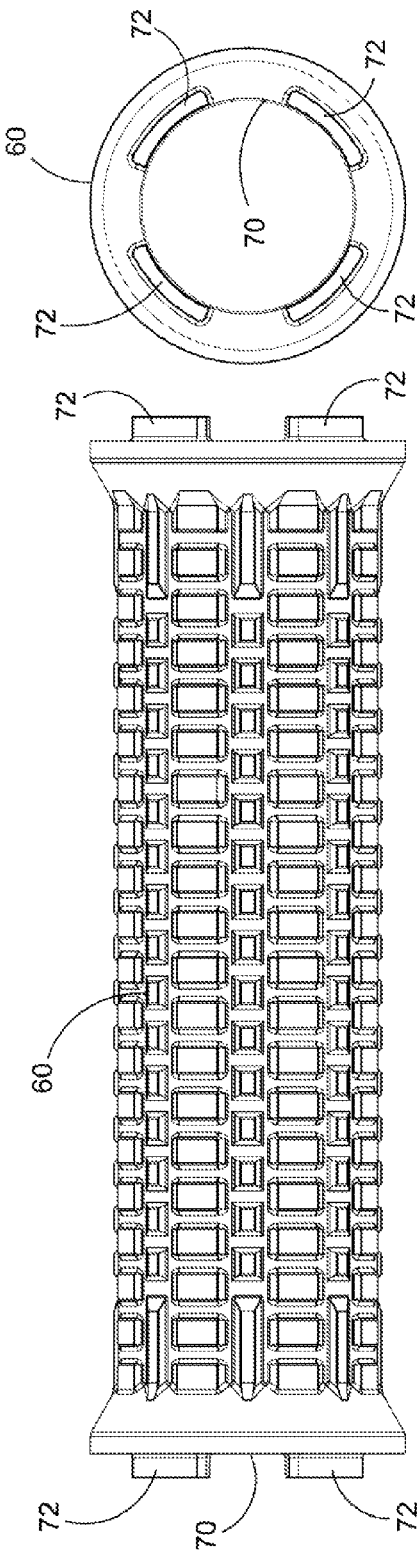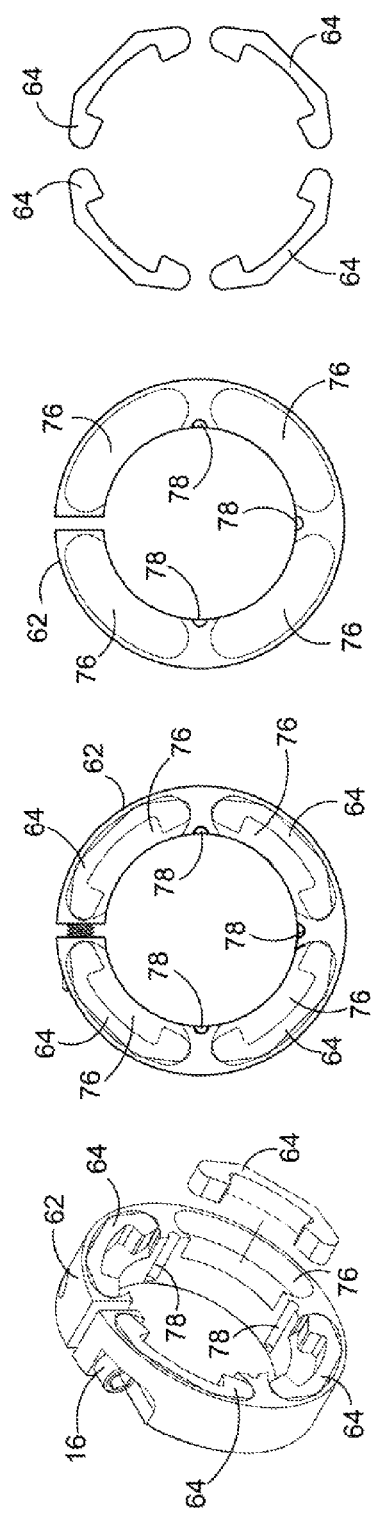
FIG. 27A
FIG. 27B
FIG. 28A
FIG. 28B
FIG. 28C
FIG. 28D

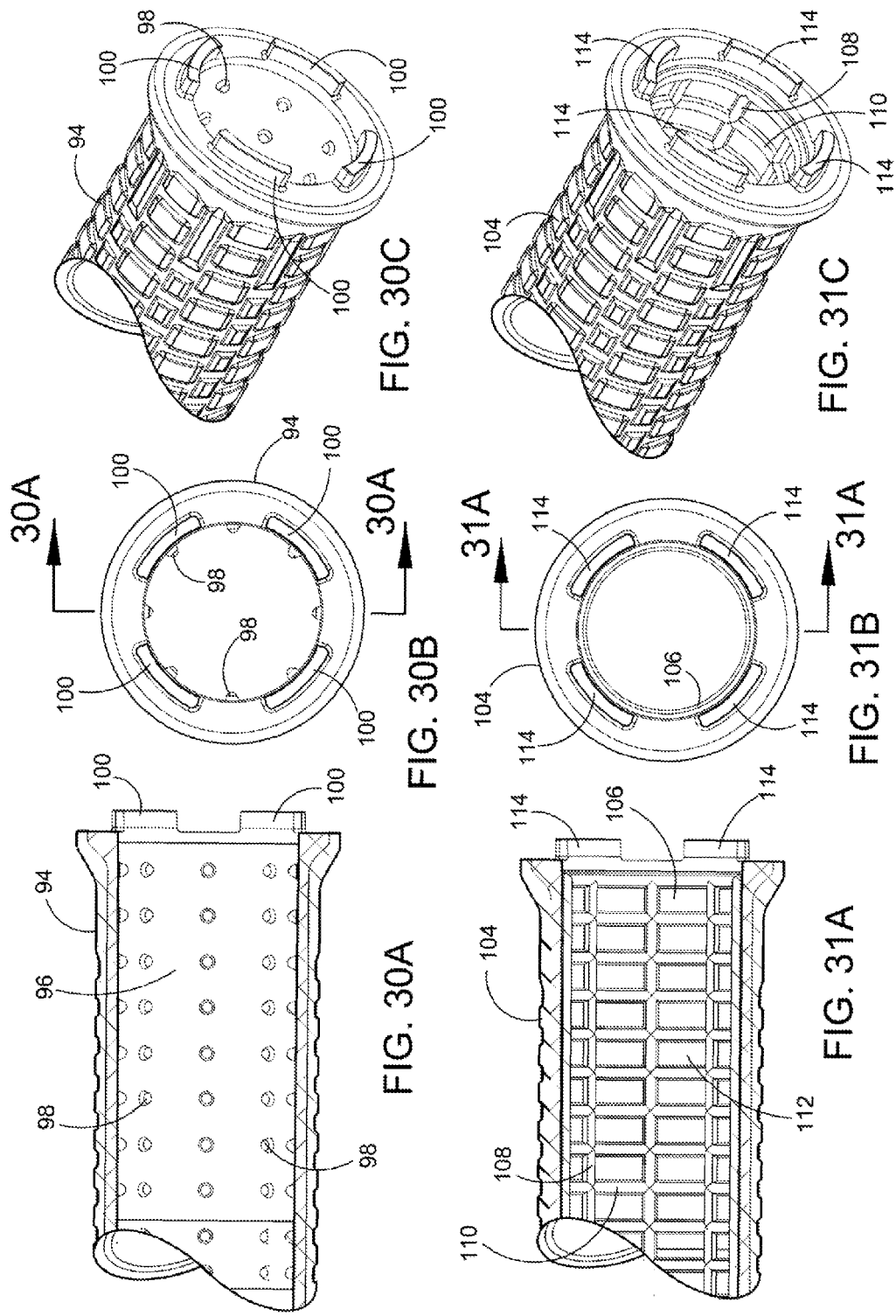

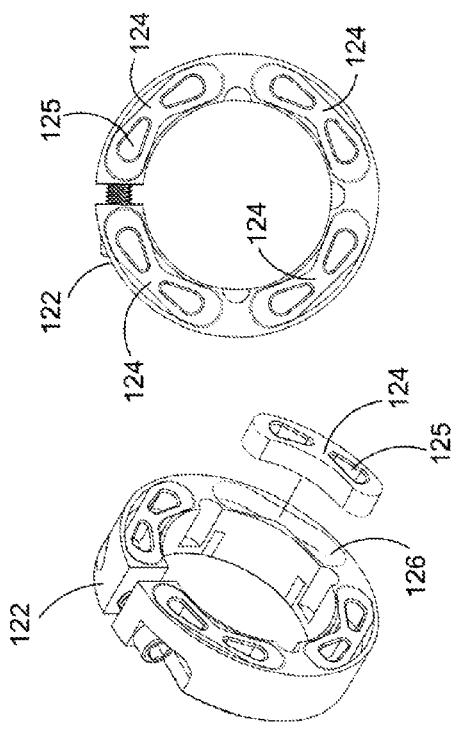
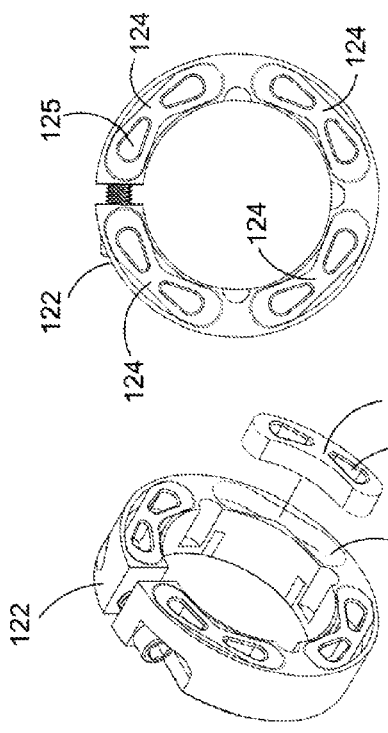
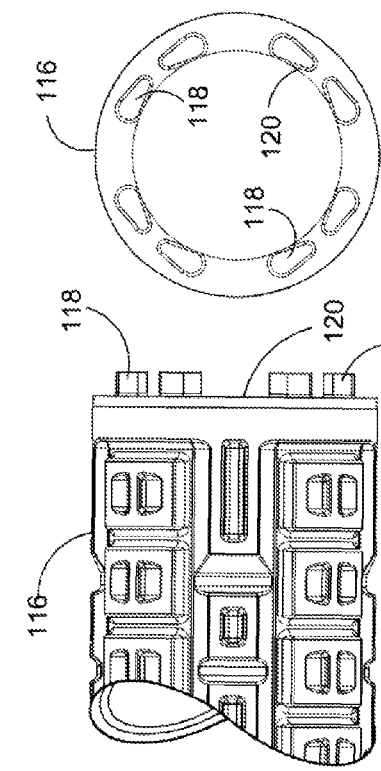
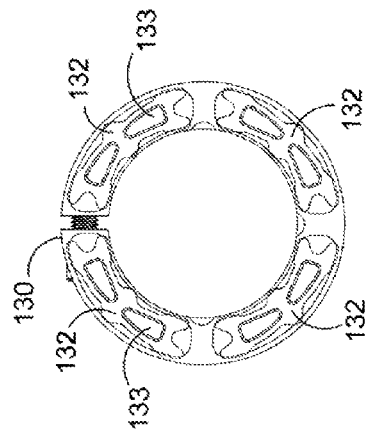
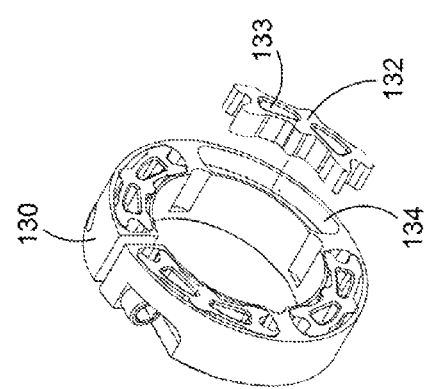

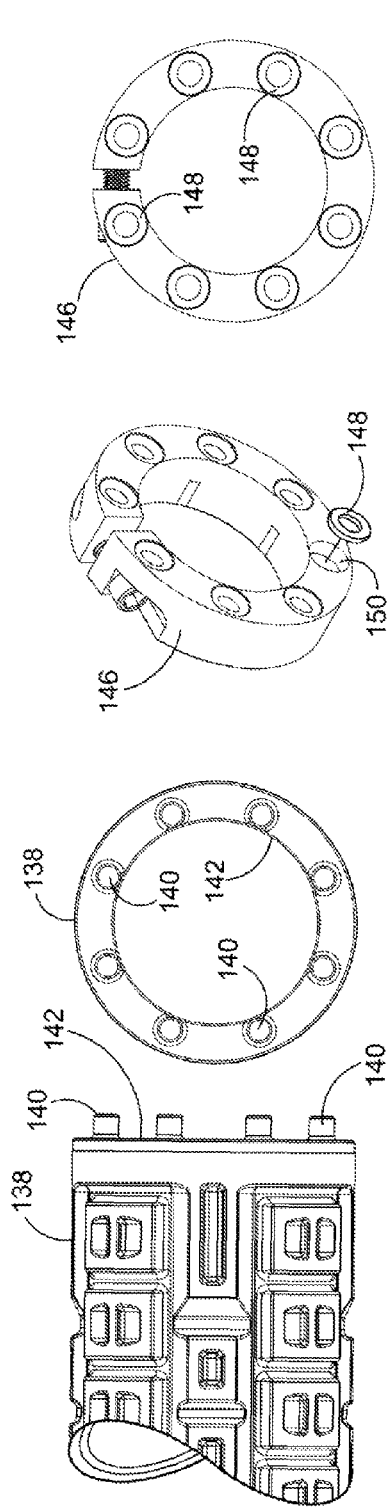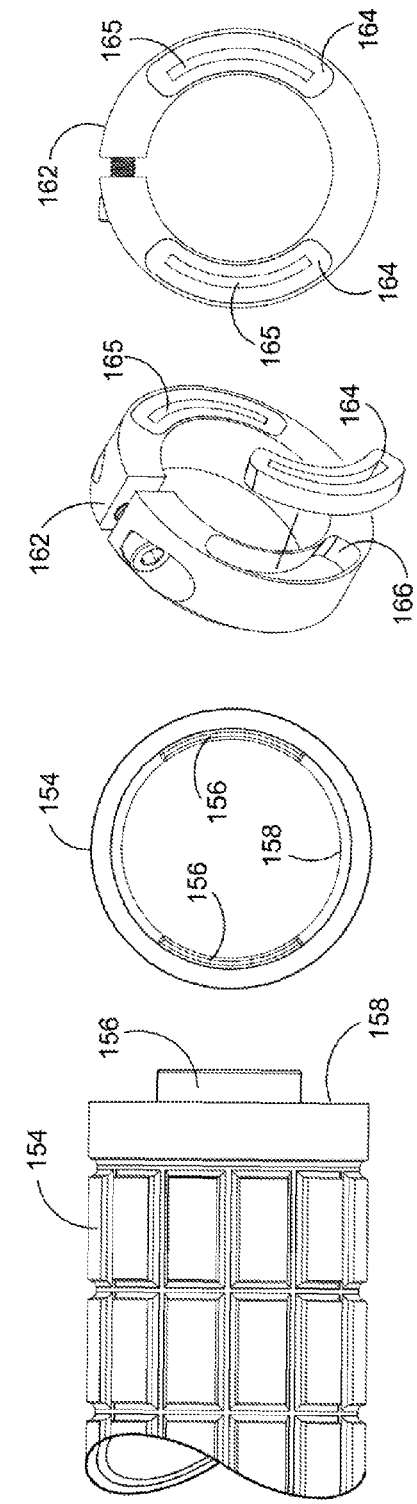

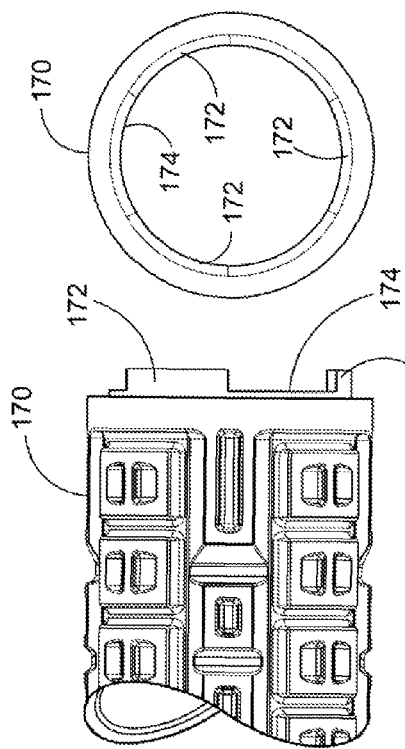
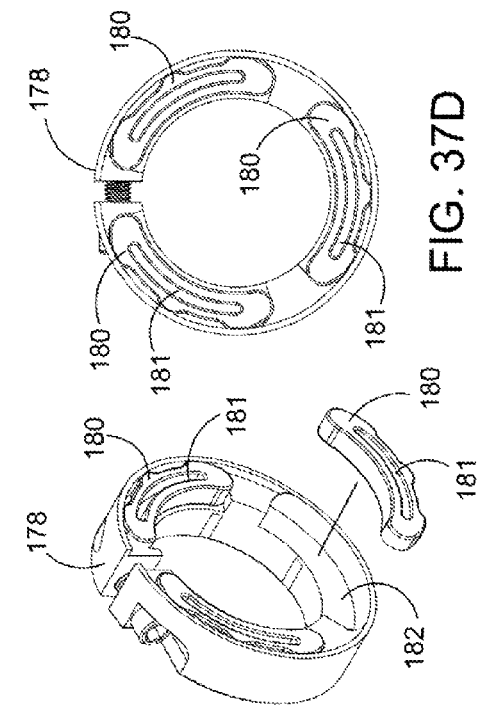
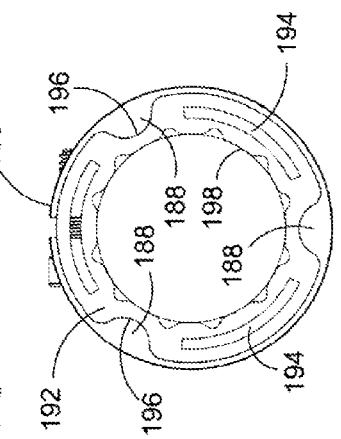
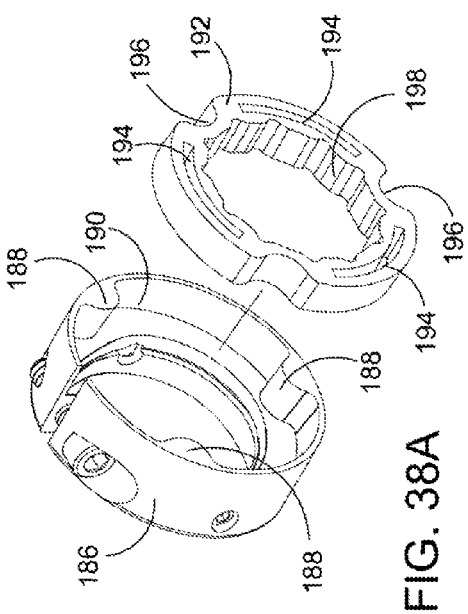
FIG. 37A
FIG. 37B
FIG. 37C
FIG. 37D
FIG. 38A
FIG. 38B

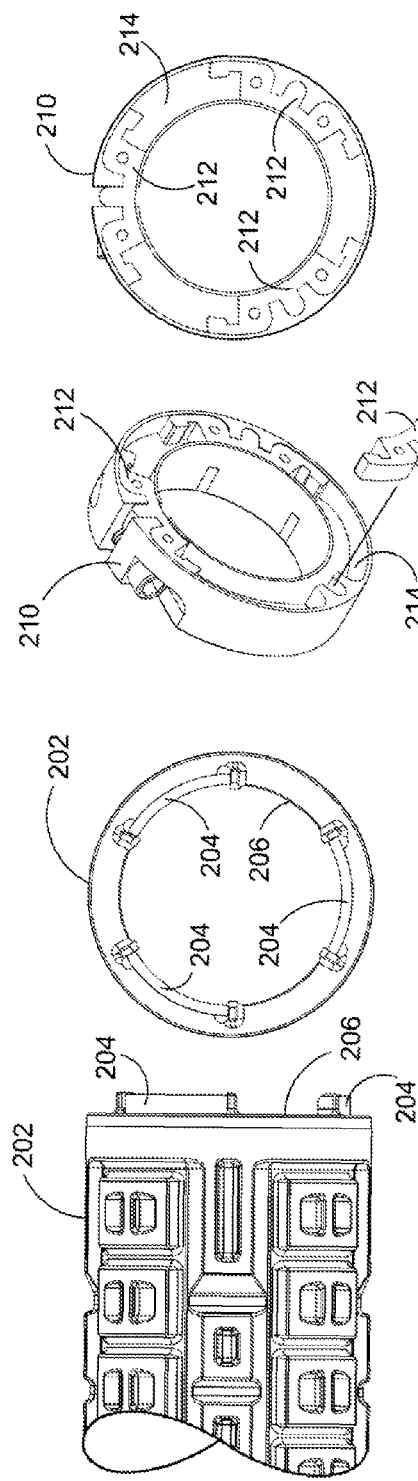
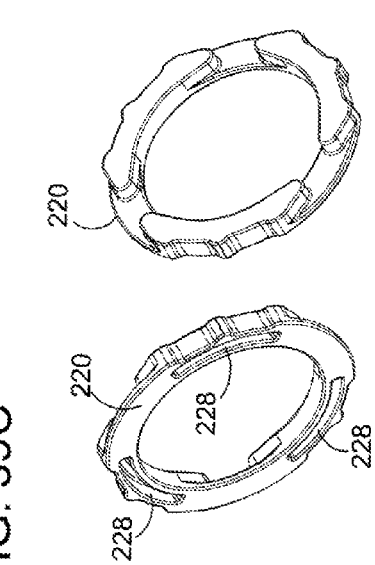
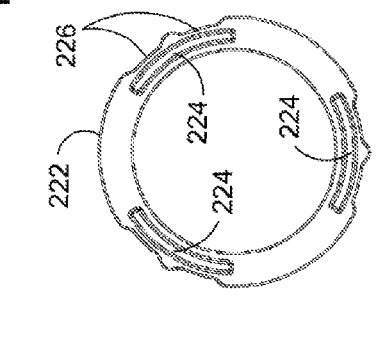
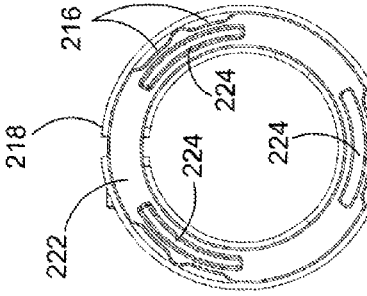
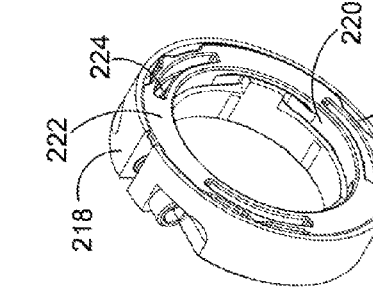
FIG. 39A
FIG. 39B
FIG. 39C
FIG. 39D
FIG. 40A
FIG. 40B
FIG. 40C
FIG. 40D
FIG. 40E

SHOCK ABSORBING GRIP ASSEMBLY

FIELD OF THE INVENTION

This application relates to shock absorbing and impact-attenuating hand grips. More specifically, the invention relates to hand grips particularly suited for use with devices that tend to transmit shocks to the arms, shoulders and back of the operator, such as the handle bars of motorcycles, off-road mountain bikes, all-terrain vehicles, snow mobiles and the like as well as power tools, hand tools, sporting goods such as golf clubs and baseball bats, and various other mounted and mountable grips.

BACKGROUND OF THE INVENTION

Handlebar grips have been utilized on the ends of handlebars for decades. These grips are typically made of a soft polymer that both improves a users' ability to grasp the handlebars and cushions the hand against the effect of vibrations and sudden impacts.

The handlebar grips are preferably made of anti-skid, relatively elastic and low durometer polymer such as rubber or urethane to enhance the cushioning effects. In off-road cycling, whether self-propelled, as in mountain biking, or powered by an internal combustion engine, as in a motorcycle, or riding an all-terrain vehicle (ATV), the rider tends to grip the handle bars tightly for balance and control. Under competitive conditions, the rider may need to enhance his/her grip for prolonged periods of time while traversing difficult terrain. Such tight gripping by the rider tends to cause shocks to be transferred to the rider's hands, wrists, forearms and related extremities. Over a period of time, these various forces can induce fatigue, and fatigue can compromise riding enjoyment and competitive results in racing.

By creating a torsional, rotational, linear and axial cushioning effect on the handlebar the Shock Absorbing Grip Assembly insure that the riders hands, wrists, forearms and related extremities are relieved from the shocks incurred during prolonged activity.

Although attempts have been made to provide handle-bar grips that are comfortable to use, ones that are too-soft do not provide adequate motion control. Those that provide good motion control tend to be too-stiff to be comfortable. Thus, there is a need for a handle bar grip that is comfortable to use, that provides precise motion control, that has good endurance, and that can be readily retro-fitted on existing handle bars.

Numerous innovations for the handlebar grip have been provided in the prior art that are described as follows. Even though these innovations may be suitable for the specific individual purposes to which they address, they differ from the present design as hereinafter contrasted. The following is a summary of those prior art patents most relevant to this application at hand, as well as a description outlining the difference between the features of the Shock Absorbing Grip Assembly and the prior art.

U.S. Pat. No. 7,013,533 of Wayne R. Lumpkin describes a grip for a cycle that includes a cylindrical liner extending along a liner axis between a first and a second end. The cylindrical liner has at least two elongate slots extending axially along a lengthwise portion of the cylindrical liner, each elongate slot overlapping a lengthwise part of another elongate slot, the overlapping elongate slots being radially offset. An over molding overlies a lengthwise of the cylindrical liner. The elongate slots are preferably disposed in a first set of at least two elongate slots extending along a first axial line in the liner and a second set of at least two elongate slots extending along a second axial line in the liner. The first and second axial lines are radially offset and the first set of elongate slots overlaps the second set of elongate slots. A first elongate slot may intercept a first end of the cylindrical liner. A compression member is provided in operative association with a circumference of an axial segment of the cylindrical liner. The axial segment includes at least a lengthwise portion of the first elongate slot. The compression member is operable between a relaxed state not compressing the axial segment and a compression segment compressing the axial segment about its circumference. The axial segment is preferably proximate the first end of the cylindrical liner.

This patent describes a grip with a cylindrical liner that has at least two elongate slots extending axially along a lengthwise portion of the cylindrical liner, each elongate slot overlapping a lengthwise part of another elongate slot, the overlapping elongate slots being radially offset. This patent does not use the elastomeric isolator members to isolate the grip portion from the handle bar giving the secure but floating sensation.

U.S. Pat. No. 8,484,806 of Gregory S. Rarick describes an ergonomic hand grip assembly. The assembly includes an outer resilient cover having an open proximal end surrounded by an annular flange. The cover is preferably molded of elastomeric material, such as rubber, that provides a satisfactory co-efficient of friction with respect to the palm of a human hand when gripped adjacent the cover flange. The elastomeric material is of conventional rubber-like composition known in art for use on outdoor equipment having a handle bar control member. The control member has a free end portion which is moveable by a user's hand to provide control motion inputs to a vehicle and to assist the vehicle rider in maintaining balance while riding the vehicle.

This patent describes an ergonomic hand grip assembly but does not use the elastomeric isolator members to isolate the grip portion from the handle bar giving the secure but floating sensation.

None of these previous efforts, however, provides the benefits attendant with the Shock Absorbing Grip Assembly. The present design achieves its intended purposes, objects and advantages over the prior art devices through a new, useful and unobvious combination of method steps and component elements, with the use of a minimum number of functioning parts, at a reasonable cost to manufacture, and by employing readily available materials.

In this respect, before explaining at least one embodiment of the Shock Absorbing Grip Assembly in detail, it is to be understood that the design is not limited in its application to the details of construction and to the arrangement of the components set forth in the following description or illustrated in the drawings.

SUMMARY OF THE INVENTION

The principle advantage of the Shock Absorbing Grip Assembly is to absorb the shock to the hands, wrists, arms, back and shoulders when holding the grip on a wide variety of vehicles, motorcycles, off-road mountain bikes, all-terrain vehicles, snow mobiles and the like as well as power tools, hand tools, sporting goods such as golf clubs and baseball bats, and various other mounted and mountable grips as well as landscape equipment.

Another advantage of the Shock Absorbing Grip Assembly is that it is a shock absorbing, suspension grip that when mounted is suspended and isolated from handlebar movement, and can easily be installed or removed from a handlebar.

Another advantage of the Shock Absorbing Grip Assembly is that it has a firm but floating sensation when holding the grip, and isolates hand and grip from the shock and vibration of the handlebar.

Another advantage of the Shock Absorbing Grip Assembly is that it can be used by a wide variety of bicycles, creating a hand grip movement that is essentially free-floating and independent of the handlebar.

Another advantage of the Shock Absorbing Grip Assembly is that it can be used by a wide variety of motorized vehicles, and facilitates reducing hand and arm fatigue, reducing arm pump, and reducing joint stress and impact.

Another advantage of the Shock Absorbing Grip Assembly is that it can be used by a wide variety of tools such as power tools, hand tools, gardening equipment like tillers and mowers, and sporting goods such as golf clubs and baseball bats.

The Shock Absorbing Grip Assembly has been designed to give a controlled free-floating action to the grip that can be adjusted by varying the different cushioning elastomeric isolator mechanisms within the grip, including varying the durometer of the material used to create the elastomeric isolator inserts.

The Shock Absorbing Grip Assembly is comprised of a slotted grip end clamp to be attached to a handlebar by the means of a screw restricting the diameter against the handlebar. One or more (preferably three or four) elastomeric or spring equipped isolator members are inserted into three or four cavities in the slotted grip end clamp and two O-rings are slid over the handle bar to be centrally located within the grip. The O-rings control and limit some of the flexibility of the grip sleeve with an elastomer grip and they are an optional part of the assembly.

A grip sleeve with an elastomer grip bonded to it is slid over the O-rings on the handlebar. The grip sleeve has three or four recesses on either end, creating protruding engagement members to fit within the spaces between the three or four elastomeric isolator members inserted in the cavities in the slotted grip end clamp. One or more (preferably three or four) elastomeric or spring equipped isolator members are located on the distal end of the grip sleeve with an elastomer grip, and fit into cavities within the second slotted grip end clamp to be attached to the handlebar by the means of a screw restricting the diameter against the handlebar. The Shock Absorbing Grip Assembly is firmly attached to the handlebar by the slotted clamp fasteners on both ends.

A handlebar end cap is affixed to the second slotted grip end clamp to be secured by the means of one or more screws. A variety of different elastomeric isolator members having different shapes and durometers are used for adjusting the flexibility of the grip.

Alternate embodiments will include a different shape of elastomeric isolator members and the addition of leaf springs against the ear sections of the grip sleeve between each of the elastomeric isolator members and one having the leaf springs with coil compression springs replacing the elastomeric isolator members.

Additional alternate embodiments include varying the durometer of the elastomeric isolator inserts to fine tune the feel of the cushion for the grip, as well as the addition of tuning washers to increase or decrease the distance the protruding engagement members into the clamp cavities, to again vary the cushion of the grip.

The foregoing has outlined rather broadly the more pertinent and important features of the present Shock Absorbing Grip Assembly in order that the detailed description of the application that follows may be better understood so that the present contribution to the art may be more fully appreciated. Additional features of the design will be described hereinafter which form the subject of the claims of this disclosure.

BRIEF DESCRIPTION OF THE DRAWINGS

The accompanying drawings, which are incorporated in and form a part of this specification illustrate embodiments of the Shock Absorbing Grip Assembly and together with the description, serve to explain the principles of this application.

FIG. 1 depicts a perspective view of a typical bicycle handle bar with two of the preferred embodiments of the Shock Absorbing Grip Assemblies.

FIG. 2 depicts an exploded view of the preferred embodiment of the Shock Absorbing Grip Assembly.

FIG. 3 depicts a side view of the preferred embodiment of the Shock Absorbing Grip Assembly.

FIG. 4 depicts an end view of the preferred embodiment of the Shock Absorbing Grip Assembly.

FIG. 5 depicts a cross section of the preferred embodiment of the Shock Absorbing Grip Assembly with the preferred embodiment of the elastomeric isolator members in place between the protruding engagement members of the grip sleeves.

FIG. 6 depicts an enlarged cross section through the slotted grip end clamp and the preferred embodiment of the elastomeric isolator members.

FIG. 7 depicts a full cross section through the preferred embodiment of the Shock Absorbing Grip Assembly.

FIG. 8 depicts a side view of the preferred embodiment of the Shock Absorbing Grip Assembly.

FIG. 14 depicts a side view of the first alternate embodiment of the Shock Absorbing Grip Assembly using spring inserts.

FIG. 15 depicts a cross section view of the first alternate embodiment of the Shock Absorbing Grip Assembly with leaf spring inserts.

FIG. 16 depicts a cross section view of the second alternate embodiment of the Shock Absorbing Grip Assembly with leaf and coil compression spring inserts.

FIG. 17 depicts a perspective view of the preferred embodiment of the elastomeric isolator member.

FIG. 18 depicts a front view of preferred embodiment of the elastomeric isolator member.

FIG. 19 depicts a front view of alternate embodiment of the elastomeric isolator member.

FIG. 20 depicts a perspective view of the grip sleeve.

FIG. 21 depicts a side view of the grip sleeve.

FIG. 22 depicts an end view of the grip sleeve.

FIG. 27A depicts a side view of the elastomer grip with the four protruding engagement members on each end.

FIG. 27B depicts a typical end view of the elastomer grip.

FIG. 28A depicts a perspective view of the inner clamp with the clamp screw and one of the elastomeric isolator members exploded away.

FIG. 28B depicts a front view of the inner clamp with the elastomeric isolator members in place.

FIG. 28C depicts a front view of the inner clamp with the elastomeric isolator members removed.

FIG. 28D depicts a front view of four elastomeric isolator members.

FIG. 30A depicts a cross section side view of a portion of the elastomer grip with grip sleeve having a plurality of nubs on inner surface.

FIG. 30B depicts an end view of the elastomer grip with the four protruding engagement members.

FIG. 30C depicts a perspective view of a portion of the elastomer grip with the four protruding engagement members.

FIG. 31A depicts a cross section side view of a portion of the elastomer grip with the grip sleeve having a matrix of horizontal and vertical ribs on inner surface.

FIG. 31B depicts an end view of the elastomer grip with the four protruding engagement members.

FIG. 31C depicts a perspective view of a portion of the end of the elastomer grip with the four protruding engagement members.

FIG. 32A depicts a side view of a portion of the elastomer grip with eight tear shaped engagement members.

FIG. 32B depicts an end view of the elastomer grip with the eight protruding tear shaped engagement members.

FIG. 33A depicts a perspective view of the inner clamp with one of the elastomeric isolator members exploded away.

FIG. 33B depicts an end view of the inner clamp with the elastomeric isolator members in position.

FIG. 34A depicts a perspective view of the inner clamp with a one of the elastomeric isolator members exploded away.

FIG. 34B depicts an end view of the inner clamp with the elastomeric isolator members in position.

FIG. 35A depicts a side view of a portion of the end of the elastomer grip with eight protruding engagement posts.

FIG. 35B depicts an end view of the end of the elastomer grip with eight protruding engagement posts.

FIG. 35C depicts a perspective view of the inner clamp with a one of the O-ring elastomeric isolators exploded away.

FIG. 35D depicts an end view of the inner clamp with the O-ring elastomeric isolator members in position.

FIG. 36A depicts a side view of a portion of the end of the elastomer grip with two protruding engagement members.

FIG. 36B depicts an end view of the elastomer grip with two protruding engagement members.

FIG. 36C depicts a perspective view of the inner clamp with a one of the elastomeric isolator member exploded away.

FIG. 36D depicts an end view of the inner clamp with the two elastomeric isolator members in position.

FIG. 37A depicts a side view of a portion of the end of the elastomer grip with three protruding engagement members.

FIG. 37B depicts an end view of the elastomer grip with three protruding engagement members.

FIG. 37C depicts a perspective view of the inner clamp with a one of the elastomeric isolator members exploded away.

FIG. 37D depicts an end view of the inner clamp with the elastomeric isolator members in position.

FIG. 38A depicts a perspective view of the inner clamp with the single elastomeric isolator member exploded away.

FIG. 38B depicts an end view of the inner clamp with the single elastomeric isolator member in position.

FIG. 39A depicts a side view of a portion of the end of the elastomer grip with three configured protruding engagement members.

FIG. 39B depicts an end view of the elastomer grip with three configured protruding engagement members.

FIG. 39C depicts a perspective view of the inner clamp with one of the elastomeric isolator members exploded away.

FIG. 39D depicts an end view of the inner clamp with the elastomeric isolator members in position.

FIG. 40A depicts a perspective view of the inner clamp with the elastomeric isolator member and compression disk in position.

FIG. 40B depicts an end view of the inner clamp with the single elastomeric isolator member and compression disk in position.

FIG. 40C depicts a front view of the single elastomeric isolator member.

FIG. 40D depicts a perspective view of the single elastomeric isolator member.

FIG. 40E depicts a rear view of the single elastomeric isolator member.

Figure 11:
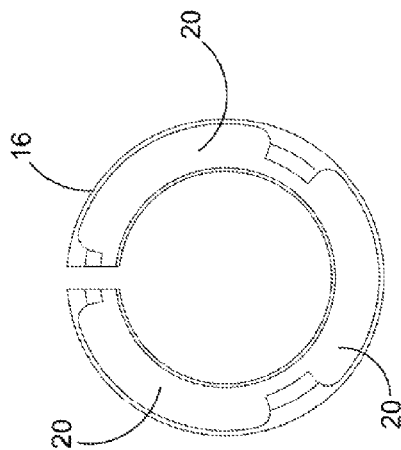
FIG. 11 depicts a front view of the slotted grip end clamp.

For a fuller understanding of the nature and advantages of the Shock Absorbing Grip Assembly, reference should be had to the following detailed description taken in conjunction with the accompanying drawings which are incorporated in and form a part of this specification, illustrate embodiments of the design and together with the description, serve to explain the principles of this application.

DETAILED DESCRIPTION OF THE PREFERRED EMBODIMENTS

Referring now to the drawings, wherein similar parts of the Shock Absorbing Grip Assembly 10A, 10B, 10C and 10D are identified by like reference numerals, there is seen in FIG. 1 a perspective view of a typical bicycle handle bar 12 with two of the preferred embodiment Shock Absorbing Grip Assembly's 10A attached at either end.

FIG. 2 depicts an exploded view of the preferred embodiment of the Shock Absorbing Grip Assembly 10A illustrating the handlebar 12 with two optional O-rings 14. The first slotted grip end clamp 16 will be locked in place on the handlebar by the means of the screw 18. The three cavities 20 in the slotted grip end cap 16 will house the three elastomeric isolator members 22A at assembly. The protruding engagement members 24 created by the three recesses 26 on both ends of the grip sleeve 28 connect between the depressions 30 on either side of each elastomeric isolator members 22A. A cover plate 32 is attached to the outer slotted grip end 16 by the means of three screws 34. The elastomer grip 36 that will cover the grip sleeve 28 is set aside for clarity.

FIG. 3 depicts a side view of the preferred embodiment of the Shock Absorbing Grip Assembly 10A including the handlebar 12. The first slotted grip end clamp 16 and the grip sleeve 28 with the elastomer grip 36 outer covering are shown next to the second slotted grip end clamp 16 with the cover plate 32 attached.

FIG. 4 depicts an end view of the preferred embodiment of the Shock Absorbing Grip Assembly 10A illustrating the cover plate 32 and the location of the three attaching screws 34 (shown in FIG. 2).

FIG. 5 depicts a cross section of the preferred embodiment of the Shock Absorbing Grip Assembly 10A through the preferred embodiment of the elastomeric isolator members 22A illustrating how the protruding engagement members 24 on the grip sleeve 28 fit within the depressions 30 on either side of each elastomeric isolator members 22A. The elastomeric isolator members 22A are shown inset within the three cavities 20 of the slotted grip end clamp 16.

FIG. 6 depicts an enlarged cross section through the handle bar 12 and slotted grip end clamp 16 with the elastomeric isolator members 22A showing how the protruding engagement members 24 on the grip sleeve 28 fit within the depressions 30 of the elastomeric isolator members 22A.

FIG. 7 depicts a full cross section through the preferred embodiment of the Shock Absorbing Grip Assembly 10A.

FIG. 8 depicts a side view of the handle bar 12 and the preferred embodiment of the Shock Absorbing Grip Assembly 10A illustrating the location of the screws 18 that clamp the slotted grip end clamps 16 to the handle bar 12.

Figure 9:
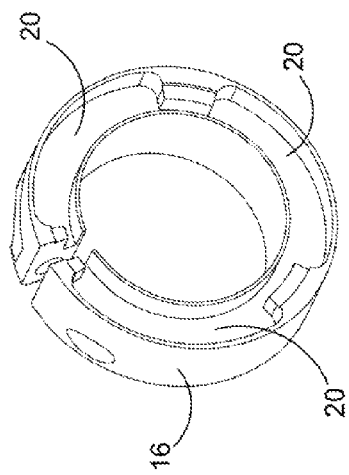
FIG. 9 depicts a perspective view of the slotted grip end clamp.

FIG. 9 depicts a perspective view of the slotted grip end clamp 16 with the three cavities 20 on the side surface.

Figure 10:
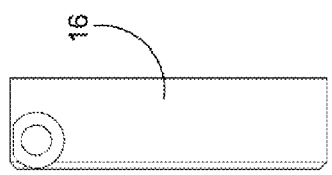
FIG. 10 depicts a side view of the slotted grip end clamp.

FIG. 10 depicts a side view of the slotted grip end clamp 16.

FIG. 11 depicts a front view of the slotted grip end clamp 16 with the three cavities 20 on the front surface.

Figure 12:
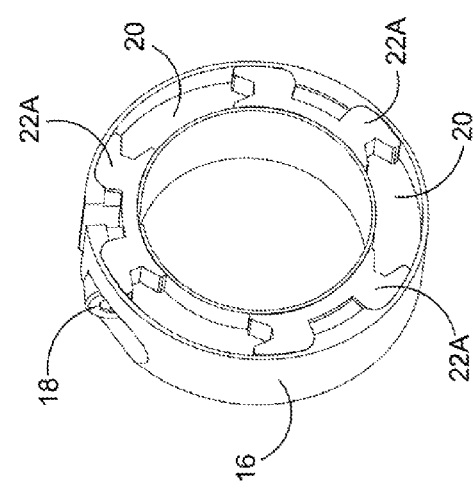
FIG. 12 depicts a perspective view of the slotted grip end clamp with the three preferred embodiments of the elastomeric isolator members inserted.

FIG. 12 depicts a perspective view of the slotted grip end clamp 16 with the three elastomeric isolator members 22A inserted.

Figure 13:
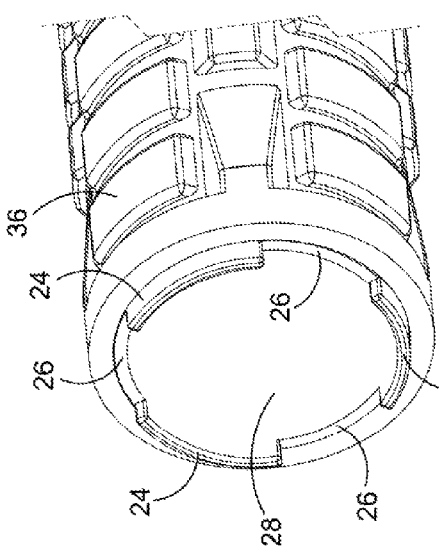
FIG. 13 depicts a perspective view of one of the preferred embodiment of the Shock Absorbing Grip Assembly illustrating the grip sleeve with the elastomer grip bonded to it and the grip sleeve having three recesses creating protruding engagement members to fit within the spaces between the three preferred embodiments of the elastomeric isolator members.

FIG. 13 depicts a perspective view of one end of the preferred embodiment of the Shock Absorbing Grip Assembly 10A illustrating the grip sleeve 28 with the elastomer grip 36 bonded to it and the grip sleeve 28 having three recesses 26 creating protruding engagement members 24 to fit within the spaces between the three elastomeric isolator members 22A.

FIG. 14 depicts a side view of the first alternate embodiment of the Shock Absorbing Grip Assembly 10B using spring inserts.

FIG. 15 depicts a cross section view of the first alternate embodiment of the Shock Absorbing Grip Assembly 10B with leaf spring inserts 42 between the inner surface of the slotted grip end clamp 16 and the protruding engagement members 24 on the grip sleeve 28. The first alternate embodiment of the elastomeric isolator members 22B is used in this application.

FIG. 16 depicts a cross section view of the second alternate embodiment of the Shock Absorbing Grip Assembly 10C with leaf spring inserts 42 and coil compression spring 44 replacing the elastomeric isolator members 22B.

FIG. 17 depicts a perspective view of the preferred embodiment of the elastomeric isolator member 22A illustrating the location of the depressions 30 on either end.

FIG. 18 depicts a front view of the preferred embodiment of the elastomeric isolator member 22A.

FIG. 19 depicts a front view of the second alternate embodiment of the elastomeric isolator member 22C with a recessed flat surface 46 on each side.

FIG. 20 depicts a perspective view of the grip sleeve 28 depicting the locations of the protruding engagement members 24 on the grip sleeve 28 on both ends.

FIG. 21 depicts a side view of the grip sleeve 28.

FIG. 22 depicts an end view of the grip sleeve 28.

Figure 23:
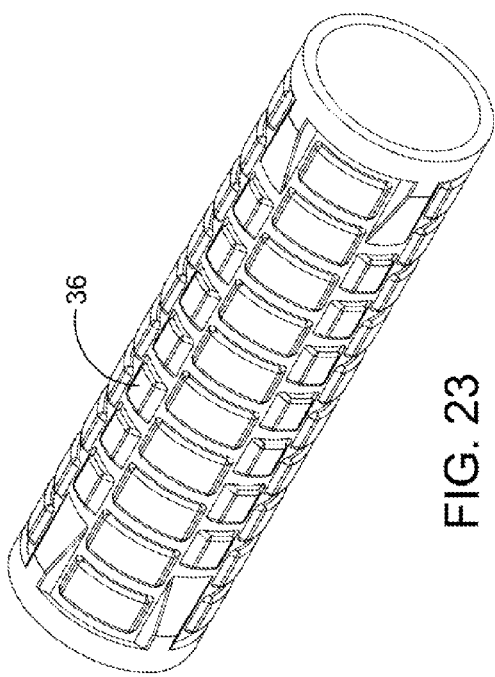
FIG. 23 depicts a perspective view of the elastomer grip.

FIG. 23 depicts a perspective view of the elastomer grip 36.

Figure 24:
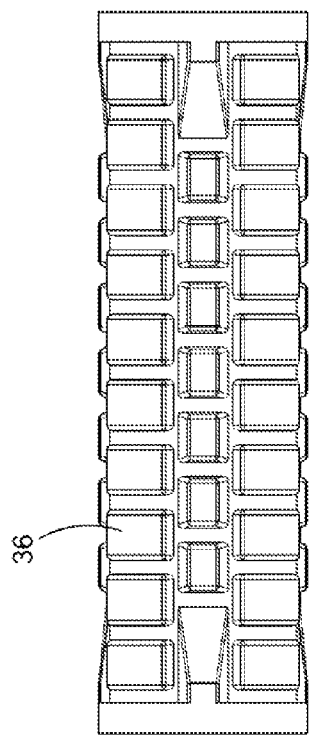
FIG. 24 depicts a side view of the elastomer grip.

FIG. 24 depicts a side view of the elastomer grip 36.

Figure 25:
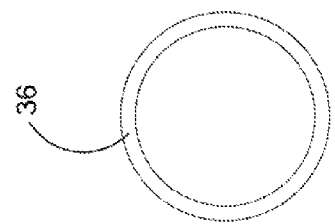
FIG. 25 depicts an end view of the elastomer grip.

FIG. 25 depicts an end view of the elastomer grip 36.

Figure 26:
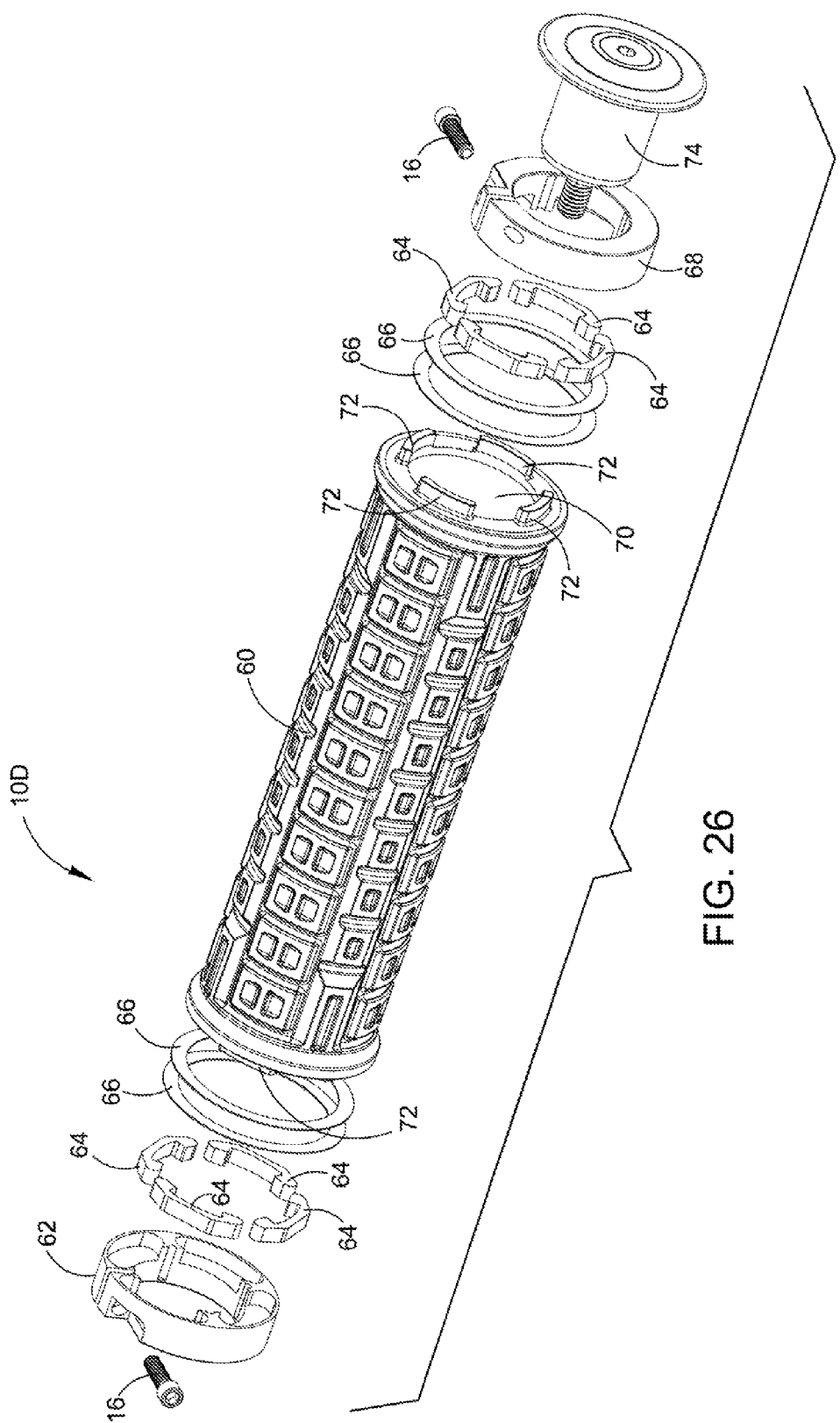
FIG. 26 depicts an exploded view of the third alternate embodiment of the Shock Absorbing Grip Assembly.

FIG. 26 depicts an exploded view of the third alternate embodiment of the Shock Absorbing Grip Assembly 10D illustrating the inner clamp 62 with the screw 16 with the four elastomeric isolator members 64. A variety of different durometers are available in fabricating all the elastomeric isolator members 64 and tuning washers 66 described giving a harder or softer compression to the parts. One or more tuning washers 66 are shown at each end of the elastomer grip 60 with the elastomeric isolator members 64 and outer clamp 68. The grip sleeve 70 of the elastomer grip 60 is shown with four protruding engagement members 72 on each end. The handle bar 12 end cap 74 is additionally shown. Additional alternate embodiments include varying the durometer of the elastomeric isolator inserts to fine tune the feel of the cushion for the grip, as well as the addition of timing washers to increase or decrease the distance the protruding engagement members into the clamp cavities, to again vary the cushion of the grip.

FIG. 27A depicts a side view of the elastomer grip 60 with the grip sleeve 70 having the four protruding engagement members 72 on each end.

FIG. 27B depicts an end view of the elastomer grip 60 with the grip sleeve 70 having the four protruding engagement members 72.

FIG. 28A depicts a perspective view of the inner clamp 62 with the clamp screw 16 and one of the elastomeric isolator members 64 exploded away. One of the isolator cavities 76 is shown within the inner clamp 62 along with the compression grooves 78.

FIG. 28B depicts a front view of the inner clamp 62 with the elastomeric isolator members 64 in place.

FIG. 28C depicts a front view of the inner clamp 62 with the elastomeric isolator members 64 removed.

FIG. 28D depicts a front view of four elastomeric isolator members 64.

Figure 29A:
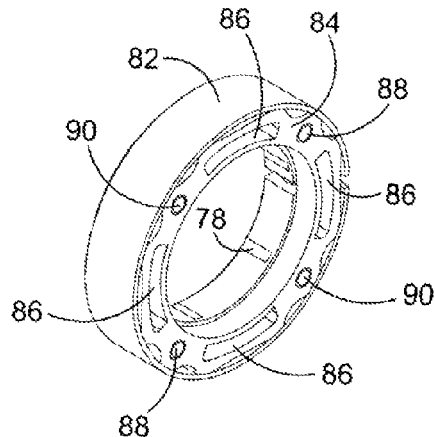
FIG. 29A depicts a perspective view of the inner clamp with a one piece elastomeric isolator member in place.

FIG. 29A depicts a perspective view of the inner clamp 82 with a one piece elastomeric isolator member 84 in place illustrating the engagement member cavities 86 and the four alignment posts 90 positioned in the four locator post orifices 88.

Figure 29B:
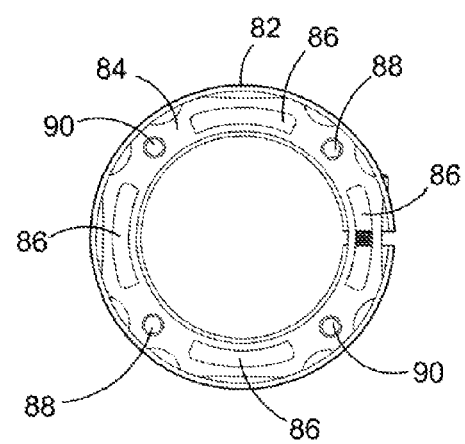
FIG. 29B depicts a front view of the inner clamp with a one piece elastomeric isolator member.

FIG. 29B depicts a front view of the inner clamp 82 with a one piece elastomeric isolator member 84 in place indicating the locations of the engagement member cavities 86 and the four alignment posts 90 positioned in the four locator post orifices 88.

Figure 29C:
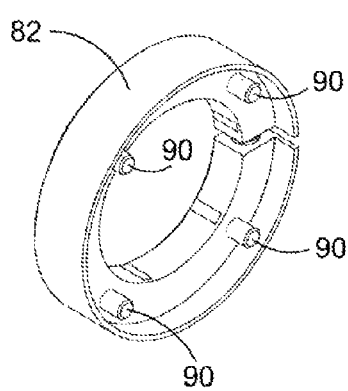
FIG. 29C depicts a perspective view of the inner clamp with a one piece elastomeric isolator member removed exposing the four alignment posts.

FIG. 29C depicts a perspective view of the inner clamp 82 with a one piece elastomeric isolator member 84 removed exposing the four alignment posts 90.

Figure 29D:
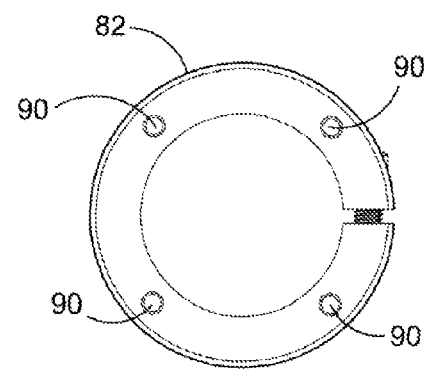
FIG. 29D depicts a front view of the inner clamp with a one piece elastomeric isolators removed exposing the four alignment posts.

FIG. 29D depicts a front view of the inner clamp 82 with a one piece elastomeric isolator member 84 removed exposing the four alignment posts 90.

Figure 29E:
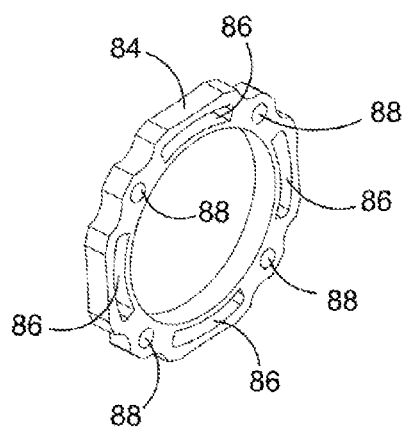
FIG. 29E depicts a perspective view of the one piece elastomeric isolator member.

FIG. 29E depicts a perspective view of the one piece elastomeric isolator member 84 indicating the locations of the engagement member cavities 86 and the locator pin orifices 88.

Figure 29F:
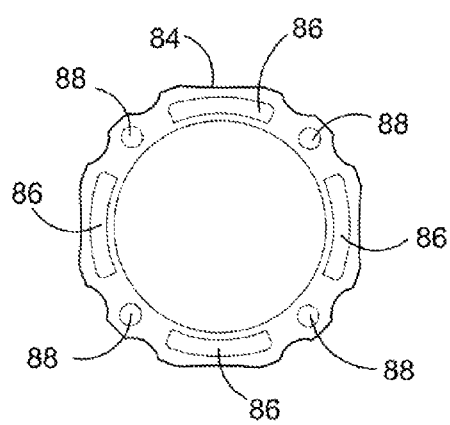
FIG. 29F depicts a front view of the one piece elastomeric isolator member.

FIG. 29F depicts a front view of the one piece elastomeric isolator member 84 indicating the locations of the engagement member cavities 86 and the locator pin orifices 88.

FIG. 30A depicts a cross section side view of a portion of the elastomer grip 94 with grip sleeve 96 having a plurality of nubs 98 and four protruding engagement members 100.

FIG. 30B depicts an end view of the elastomer grip 94 with the four protruding engagement members 100 and a plurality of nubs 98.

FIG. 30C depicts a perspective view of a portion of the elastomer grip 94 with the four protruding engagement members 100 and a plurality of nubs 98 on the grip sleeve 96.

FIG. 31A depicts a cross section side view of a portion of the elastomer grip 104 with the grip sleeve 106 having a matrix of horizontal ribs 108 and vertical ribs 110 on inner surface 112 and four protruding engagement members 114.

FIG. 31B depicts an end view of the elastomer grip 104 with the four protruding engagement members 114.

FIG. 31C depicts a perspective view of a portion of the end of the elastomer grip 104 with a matrix of horizontal ribs 108 and vertical ribs 110 on grip sleeve 106 and four protruding engagement members 14.

FIG. 32A depicts a side view of a portion of the elastomer grip 116 with eight tear shaped engagement members 118 on the grip sleeve 120.

FIG. 32B depicts an end view of the elastomer grip 116 with the eight protruding tear shaped engagement members 118 on the grip sleeve 120.

FIG. 33A depicts a perspective view of the inner clamp 122 with one of the elastomeric isolator member 124 having the engagement member cavities 125 exploded away from the isolator cavity 126

FIG. 33B depicts a front view of the inner clamp 122 with the elastomeric isolator members 124 having the engagement member cavities 125 in position.

FIG. 34A depicts a perspective view of the inner clamp 130 with a one of the elastomeric isolator member 132 having the engagement member cavities 133 exploded away from the isolator cavity 134.

FIG. 34B depicts a front view of the inner clamp 130 with the elastomeric isolator member 132 having the engagement member cavities 133 in position.

FIG. 35A depicts a side view of a portion of the end of the elastomer grip 138 with eight protruding engagement posts 140 on the grip sleeve 142.

FIG. 35B depicts a front view of the end of the elastomer grip 138 with eight protruding engagement posts 140 on the grip sleeve 142.

FIG. 35C depicts a perspective view of the inner clamp 146 with a one of the O-ring elastomeric isolators 148 exploded away from the isolator cavity 150.

FIG. 35D depicts a front view of the inner clamp 146 with the O-ring elastomeric isolators 148 in position.

FIG. 36A depicts a side view of a portion of the end of the elastomer grip 154 with two protruding engagement members 156 on the grip sleeve 158.

FIG. 36B depicts an end view of the end of the elastomer grip 154 with two protruding engagement members 156 on the grip sleeve 158.

FIG. 36C depicts a perspective view of the inner clamp 162 with a one of the elastomeric isolator member 164 with engagement member cavities 165 exploded away from the isolator cavity 166.

FIG. 36D depicts a front view of the inner clamp 162 with the two elastomeric isolator members 164 in position.

FIG. 37A depicts a side view of a portion of the end of the elastomer grip 170 with three protruding engagement members 172 on the grip sleeve 174.

FIG. 37B depicts an end view of the elastomer grip 170 with three protruding engagement members 172 on the grip sleeve 174.

FIG. 37C depicts a perspective view of the inner clamp 178 with one of the elastomeric isolator member 180 having engagement member cavities 181 exploded away from the isolator cavity 182.

FIG. 37D depicts a front view of the inner clamp 178 with the elastomeric isolator members 180 having engagement member cavities 181 in position.

FIG. 38A depicts a perspective view of the inner clamp 186 having three indexing and anti-rotation members 188 in the isolator cavity 190 with the single elastomeric isolator member 192 with engagement member cavities 194, indexing depressions 196 and scalloped shock absorbing inner surface 198 exploded away.

FIG. 38B depicts a front view of the inner clamp 186 having the single elastomeric isolator member 192 with engagement member cavities 194, indexing depressions 196 and scalloped shock absorbing inner surface 198 in position.

FIG. 39A depicts a side view of a portion of the end of the elastomer grip 202 with three configured protruding engagement members 204 on the grip sleeve 206.

FIG. 39B depicts an end view of the elastomer grip 202 with three configured protruding engagement members 204 on the grip sleeve 206.

FIG. 39C depicts a perspective view of the inner clamp 210 with the elastomeric isolator member 212 exploded away from the isolator cavity 214.

FIG. 39D depicts a front view of the inner clamp 210 with the elastomeric isolator members 212 in position within the isolator cavity 214.

FIG. 40A depicts a perspective view of the inner clamp 218 with the elastomeric isolator member 220 in position behind the compression disk 222 with three engagement slots 224 and three sets of compression disk absorbing cavities 216.

FIG. 40B depicts a front view of the inner clamp 218 with the single elastomeric isolator member 220 behind the compression disk 222 having three engagement slots 224 and three sets of compression disk absorbing cavities 216.

FIG. 40C depicts a front view of the compression disk 222 having three engagement slots 224 and three sets of compression disk absorbing cavities 226.

FIG. 40D depicts a perspective view of the single elastomeric isolator member 220 with three engagement member cavities 228.

FIG. 40E depicts a rear view of the single elastomeric isolator member 220.

Alternatively, the elastomeric inserts may be omitted altogether in place of protrusions on the sleeve that have shock absorbing characteristics. The "protrusions, attachment members," or the like are made of a material that allows the grip to move independent of the handlebar without the need for separate inserts. This design may or may not be used with elastomeric inserts. Essentially, the clamp cavities would mate with the protrusions on the grip tube assembly directly and without the "buffer" of the inserts, while still providing a free-floating feel and independent cushioning of the grip.

Another alternate design is the inverse of the represented design whereas the grip end clamp has protruding engagement members and the grip sleeve contains one or more cavities that mates with said protruding engagement members. The inverse design can be used with or without elastomeric inserts just as the prior described Shock Absorbing Grip Assembly invention as described herein demonstrates.

The Shock Absorbing Grip Assembly 10A, 10B and 10C shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing a Shock Absorbing Grip Assembly 10A, 10B and 10C in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineer and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A shock absorbing grip assembly comprising:
   a) one or more slotted grip end clamps;
   b) one or more cavities in said slotted grip end clamps;
   c) a grip sleeve, wherein said grip sleeve includes one or more protruding engagement members, and further wherein said grip sleeve and protruding engagement members are constructed of material that allows for independent movement from a handle or handlebar when mounted to the handle or handlebar, wherein said one or more protruding engagement members mates within said cavities in said slotted grip end clamps; and
   d) an outer grip which covers said grip sleeve;
   wherein said grip end clamp suspends said grip sleeve from contact with the handle or handlebar, whereby said grip sleeve has torsional, rotational, linear and axial shock absorbing capacity when mounted to the handle or handlebar.

2. A shock absorbing grip assembly according to claim 1, including one or more elastomeric isolator inserts, housed within the cavities of said grip end clamp, that suspend said grip sleeve apart from the handle or handlebar when said clamp is mounted.

3. The shock absorbing grip assembly according to claim 2, including one or more tuning washers positioned between said grip sleeve and said slotted grip end clamp, wherein as more tuning washers are placed between said sleeve and said clamp, said tuning washers decrease the distance said protruding engagement members travel into said cavities housing said elastomeric isolator inserts, thereby adjusting the shock absorbing capacity of the grip assembly.

4. The shock absorbing grip assembly according to claim 2, wherein said one or more elastomeric isolator inserts housed within each of said one or more cavities in said first and second slotted grip end clamps are constructed of varying durometer elastomer material, and thereby adjust the shock absorbing capacity of the grip assembly.

5. The shock absorbing grip assembly according to claim 2, wherein said one or more cavities includes four cavities and one or more elastomeric isolator inserts includes four inserts and said one or more protruding engagement members includes four protruding engagement members.

6. The shock absorbing grip assembly according to claim 2, wherein said one or more cavities includes one cavity and one or more elastomeric isolator inserts includes one insert and said one or more protruding engagement members includes one protruding engagement members.

7. The shock absorbing grip assembly according to claim 6, wherein said one elastomeric isolator insert is secured within said one cavity by one or more alignment posts located within said cavity of said clamp housing said insert.

8. The shock absorbing grip assembly according to claim 2, wherein said one or more cavities includes four cavities and one or more elastomeric isolator inserts includes four inserts and said one or more protruding engagement members includes eight protruding engagement members.

9. The shock absorbing grip assembly according to claim 2, wherein said one or more cavities includes eight cavities and one or more elastomeric isolator inserts includes eight inserts in the form of O-rings, and said one or more protruding engagement members includes eight protruding engagement members.

10. The shock absorbing grip assembly according to claim 1, including one or more tuning washers positioned between said grip sleeve and said slotted grip end clamp, wherein as more tuning washers are placed between said sleeve and said clamp, said tuning washers decrease the distance said protruding engagement members travel into said cavities, thereby adjusting the shock absorbing capacity of the grip assembly.

11. The shock absorbing grip assembly according to claim 1, wherein said slotted grip clamps are secured to the handlebar using a screw.

12. The shock absorbing grip assembly according to claim 11, wherein said slotted grip clamps include anti-rotation and lateral movement compression grooves to secure said clamp to the handlebars when said clamp is mounted and said screw is tightened.

13. A method of making a shock absorbing grip assembly comprising:
   a) providing one or more slotted grip end clamps;
   b) providing one or more cavities in said slotted grip end clamps;
   c) providing a grip sleeve, wherein said grip sleeve includes one or more protruding engagement members, and further wherein said grip sleeve and protruding engagement members are constructed of material that allows for independent movement from a handle or handlebar when mounted to the handle or handlebar, wherein said one or more protruding engagement members mates within said cavities in said slotted, grip end clamps; and
   d) providing an outer grip which covers said grip sleeve;

wherein said grip end clamp suspends said grip sleeve from contact with the handle or handlebar, whereby said grip sleeve has torsional, rotational, linear and axial shock absorbing capacity when mounted to the handle or handlebar.

14. The method for making a shock absorbing grip assembly according to claim 13, including one or more elastomeric isolator inserts, housed within the cavities of said grip end clamp, that suspend said grip sleeve apart from the handle or handlebar when said clamp is mourned.

15. The shock absorbing grip assembly according to claim 14, including one or more tuning washers positioned between said grip sleeve and said slotted grip end clamp, wherein as more tuning washers are placed between said sleeve and said clamp, said tuning washers decrease the distance said protruding engagement members travel into said cavities housing said elastomeric isolator inserts, thereby adjusting the shock absorbing capacity of the grip assembly.

16. The method for making a shock absorbing grip assembly according to claim 14, wherein said one or more elastomeric isolator inserts housed within each of said one or more cavities in said first and second slotted grip end clamps are constructed of varying durometer elastomer material, and thereby adjust the shock absorbing capacity of the grip assembly.

17. The method for making a shock absorbing grip assembly according to claim 14, wherein said one or more cavities includes bur cavities and one or more elastomeric isolator inserts includes four inserts and said one or more protruding engagement members includes four protruding engagement members.

18. The method for making a shock absorbing grip assembly according to claim 14, wherein said one or more cavities includes one cavity and one or more elastomeric isolator inserts includes one insert and said one or more protruding engagement members includes one protruding engagement member.

19. The method for making a shock absorbing grip assembly according to claim 18, wherein said one elastomeric isolator insert is secured within said one cavity by one or more alignment posts located within said cavity of said clamp housing said insert.

20. The method for making a shock absorbing grip assembly according to claim 14, wherein said one or more cavities includes four cavities and one or more elastomeric isolator inserts includes four inserts and said one or more protruding engagement members includes eight protruding engagement members.

21. The method for making a shock absorbing grip assembly according to claim 14, wherein said one or more cavities includes eight cavities and one or more elastomeric isolator inserts includes eight inserts in the form of O-rings, and said one or more protruding engagement members includes eight protruding engagement members.

22. The method for making a shock absorbing grip assembly according to claim 13, including one or more tuning washers positioned between said grip sleeve and said slotted grip end clamp, wherein as more tuning washers are placed between said sleeve and said clamp, said tuning washers decrease the distance said protruding engagement members travel into said cavities, thereby adjusting the shock absorbing capacity of the grip assembly.

23. The method for making a shock absorbing grip assembly according to claim 13, wherein said slotted grip clamps are secured to the handle or handlebar using a screw.

24. The method for making a shock absorbing grip assembly according to claim 23, wherein said slotted grip clamps include anti-rotation and lateral movement compression grooves to secure said clamp to the handle or handlebar when said clamp is mounted and said screw is tightened.

* * * * *